United States Patent [19]

Chrisman et al.

[11] 4,278,460
[45] Jul. 14, 1981

[54] METHOD AND APPARATUS FOR MIXING AND HOMOGENIZING MOLTEN GLASS

[75] Inventors: Max G. Chrisman, Granville; Gary W. Ganzala, Columbus; Ralph L. Tiede, Granville, all of Ohio

[73] Assignee: Owens-Corning Fiberglas Corporation, Toledo, Ohio

[21] Appl. No.: 31,263

[22] Filed: Apr. 18, 1979

Related U.S. Application Data

[63] Continuation of Ser. No. 735,487, Oct. 26, 1976, abandoned.

[51] Int. Cl.³ ............................................. C03B 5/187
[52] U.S. Cl. ...................................... 65/134; 65/135; 65/179; 65/335; 65/346; 366/266; 366/300; 259/266; 259/300
[58] Field of Search ................. 65/134, 135, 136, 178, 65/179, 157, 335, 346; 259/8, 97

[56] References Cited

U.S. PATENT DOCUMENTS

| 3,328,150 | 6/1967 | Rough | 65/134 |
| 4,046,547 | 9/1977 | Pieper | 65/135 |
| 4,099,951 | 1/1978 | Pieper | 65/135 |

*Primary Examiner*—Arthur D. Kellogg
*Attorney, Agent, or Firm*—Ronald C. Hudgens; Patrick P. Pacella; Robert F. Rywalski

[57] ABSTRACT

Method and apparatus is presented particularly suitable for blending and homogenizing a low viscosity molten additive into a relatively high viscosity host glass composition as it flows through a supply forehearth. The blending and homogenizing is performed by a rotating spiral stirrer operating within a mixing well simultaneously mixing and pumping the molten mixture therethrough. The spiral stirrer may be used separately or in concert with one or more spiral stirrers.

22 Claims, 23 Drawing Figures

METHOD AND APPARATUS FOR MIXING AND HOMOGENIZING MOLTEN GLASS

This is a continuation of application Ser. No. 735,487, filed Oct. 26, 1976, now abandoned.

BACKGROUND OF THE INVENTION

In the past, molten glass has been prepared by charging into a glass melter a formulation containing all of the necessary ingredients to produce the desired end glass composition. By the prior art methods, molten glass compositions are necessarily limited to compositions containing only those constituents which can survive the environment of the glass melter. Such limitations may be eliminated by the multi-step method of glass making taught in co-owned U.S. patent application Ser. No. 680,841, filed May 5, 1976, now abandoned whereby the constituents of the desired molten glass compositions are classified into two or more constituent groups based upon their individual melting or reactive characteristics. The constituent groups are separately prepared as molten masses, one of which is chosen as a base or host glass into which the other groups are sequentially mixed and reacted to form the desired molten glass composition. It is preferable to intermix and react the additive constituent groups with the molten glass as it flows through the forehearth.

In practicing the multi-step glass making process there may be large differences between the host glass viscosity and the viscosity of the molten additives. Thus, intermixing and reacting these molten masses presents a particular problem to be overcome. The prior art teaches two basic mixing techniques for homogenizing molten glass. The molten mixture may be flowed downward through the apparatus as in U.S. Pat. Nos. 2,520,577; 2,569,459 and 2,716,023 or through a horizontal mixing region within the forehearth as in U.S. Pat. Nos. 3,057,175; 2,467,809; 3,723,084 and 3,328,150. Of these two prior art approaches the former is most efficient; however, it is necessary that the glass melter be at a suitable elevation above that of the forming positions to provide the necessary vertical drop. The latter technique, as taught in the prior art, is not suitable for homogenizing a molten additive into a host glass where the additive viscosity is significantly lower than that of the host glass and more particularly where the less viscous additive is highly volatile. A low density volatile additive will tend to surface within the forehearth and volatilize, compounding the mixing operation and creating pollution consequences.

SUMMARY OF THE INVENTION

The present invention provides improved method and apparatus for homogenizing a molten glass mixture flowing through a distribution forehearth. The term forehearth as used herein means any channel, conduit or passageway used to distribute or convey molten glass making constituents from a melting zone to the end product forming apparatus. The herein invention is particularly suitable for introducing, mixing and homogenizing a low viscosity additive, either as a melt or solid phase, into a molten host glass composition. By practicing our invention molten glass may be homogenized without the need for a multi-level forehearth and within a confined area employing a minimum of mechanical stirrers.

By our method of homogenizing molten glass flowing through a forehearth the composition is mechanically blended in such a way that the translational progress along the forehearth is temporarily impeded by creating a reverse flow. Thus, an increased forehearth residence period is provided allowing for mixing and chemical reaction of the blended constituents before flowing further downstream Preferred apparatus for practicing the present invention basically comprises a block structure placed within the forehearth acting as a flow restriction and an integral mixing-pumping unit. The dam like mixing block may be used separately or in combination with other mixing blocks. The typical mixing block structure comprises a refractory block extending across the forehearth width so as to act as a dam. The height of the block is such that its top surface will be submerged below the effective working level of the flowing molten glass. A well extends downward from the block's top surface communicating with a passageway formed by the forehearth floor and a slot cut into the bottom of the block. A spiral stirrer positioned within the well, pumps the molten mixture upward or downward, depending upon the function of the block, thus causing the bottom passageway to act as an inlet or outlet port respectively.

When using a single mixing block it is preferred to position the block such that the bottom passageway communicates between the well and the block's upstream face acting as an inlet port. The spiral stirrer is rotated to pump the molten mixture upward through the block simultaneously blending and homogenizing the molten mixture as it is pumped. The blended mixture upon exiting the top of the block separates into a downstream flowing portion and an upstream flowing portion. The amount of upstream or back flow may be controlled by stirrer speed, the forehearth flow parameters, or by modifications of the mixing block's top surface configuration. The back flow portion of molten glass is re-cycled through the mixing block providing further blending and homogenizing. Therefore, the flow rate through the mixing block is greater than the average continuous forehearth flow, by the amount of such back flow.

Because of the relatively high viscosity of molten glass the degree of mixing accomplished by the stirrers versus the amount of volumetric pumping becomes a trade-off greatly influenced by torque limitations of the apparatus. When a single mixing block is used it may be desirable to trade the amount of mixing for increased flow rate, thus obtaining a flow rate much greater than the forehearth average. The molten glass may then be re-cycled a multiple number of times to achieve the proper homogenization.

However, since it is not certain that all molten glass processed through the mixing block will in fact be recycled before preceeding downstream an alternative is to employ two or more parallel stirrers within the block. Thus, a greater percentage of the input torque to each stirrer may be used to blend the molten mixture.

Where it is deemed necessary to subject the molten mixture to multiple blending operations it is preferred to place two or more mixing blocks tandem to one another within the forehearth. In the tandem mixing block arrangement it is preferred that the first or upstream block operate such that the molten mixture enters the stirrer well at the top of the block being pumped down through the stirrer well by the action of the spiral stirrer and exiting at the downstream face of the block. Each successive mixing block would then function as the single block embodiment described above, namely, pumping upward with its inlet port at the upstream face of the block and its exiting volumetric flow split into an upstream or back mixing portion and a downstream flowing portion. Many multiple mixing block combinations are conceivable using combinations of up and down pumping blocks. Many of these combinations are described below.

The spiral stirrer may be modified to increase its blending efficiencies; however, modifications which increase shear mixing may also be expected to increase torque requirements. For example, it has been found, that the presence of alternately deflecting baffles positioned on the spiral stirrer flights greatly increase the effective shear mixing of the stirrer; however, the driving torque requirements also increase complicating stirrer shaft design. Experimentation with spiral stirrer modifications generally show that increases in shear mixing efficiencies are accompanied by substantial torque increases and/or decreases in volumetric pumping.

Because of the various stirrer modifications and possible mixing block combinations it is strongly recommended that laboratory models be used to determine the optimum system with particular attention given to stirrer torque requirements.

DETAILED DESCRIPTION OF THE INVENTION

Figure 1:
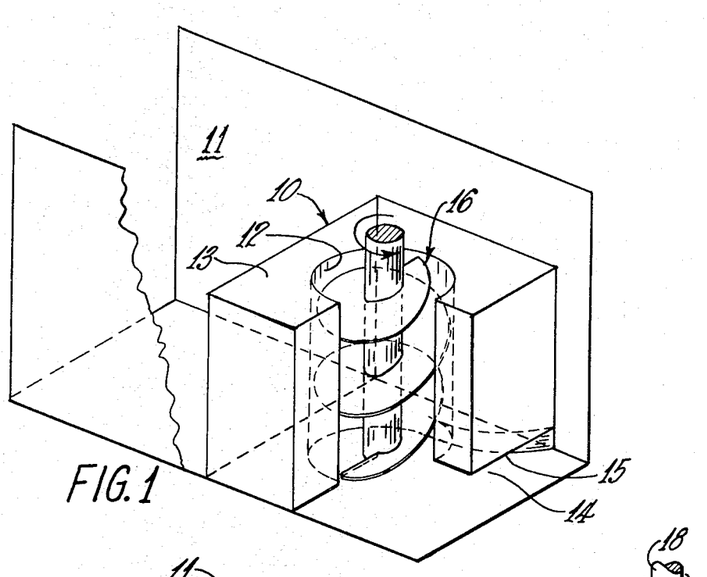
FIG. 1 presents a pictorial view showing the elements of a typical down-pumping mixing block positioned within a forehearth channel.
Figure 2:
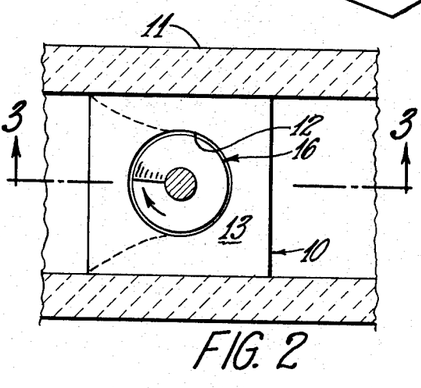
FIG. 2 presents a plan view of a typical single stirrer upward pumping mixing block configuration.
Figure 3:
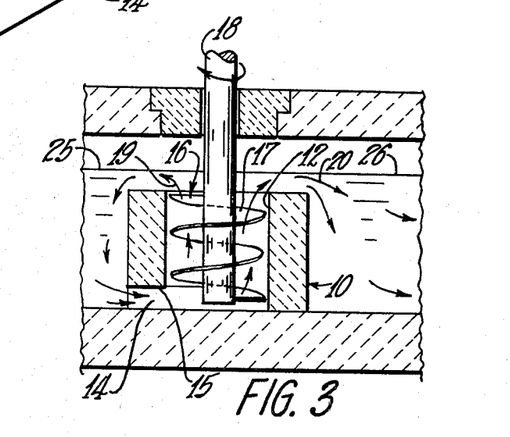
FIG. 3 presents an elevational view along line 3—3 of FIG. 2 showing the mixing block elements and flow pattern.

FIGS. 1 through 3 present a typical embodiment of the present invention showing the principal elements thereof. Block 10 is positioned within forehearth 11 and extends across the total width of the forehearth in a dam like manner. Stirrer well 12 extends from the top surface 13 of block 10 communicating with passageway 14 formed by the floor of forehearth 11 and slot 15, cut into the bottom of block 10. It is preferable that stirrers well 12 be vertical to the forehearth floor; however, it may be sloped at any convenient angle. Further, the block top surface 13 may be horizontal or sloped either upstream or downstream for purposes described below. Positioned within stirrer well 12 is spiral stirrer 16 generally comprising a spiral blade 17 wrapped about a central shaft 18 rotatably powered by any preferred means such as a geared electric motor (not shown). Depending upon the function of the mixing block, stirrer 16 is rotated clockwise or counter-clockwise to pump the molten mixture upward or downward as desired, simultaneously blending the mixture. Passageway 14 thus becomes an inlet port or exit port respectively for stirrer well 12.

It is preferred for a single mixing block to pump upward as shown in FIG. 3. Thus, passageway 14 becomes an intake port through which all molten glass flowing through the forehearth passes. The molten glass upon entering intake port 14 is pumped upward by the action of spiral stirrer 16. Because of the relatively high viscosity of molten glass and corresponding high viscous drag between the molten glass and stirrer spiral blade 17 the molten glass tends to roll as a result of the relative motion between spiral blade 17 and molten glass. Simultaneously the molten glass is lifted upward within well 12 causing a similiar rolling action along the well side wall. Hence, the molten glass rolls and mixes within the confines of the spiral blade flight, stirrer shaft and well side wall as it progresses upward through mixing block 10.

The volumetric flow rate through mixing block 10 is preferably greater than the mean continuous forehearth flow rate that would otherwise exist absent the presence of the mixing block within the forehearth. Thus, the flow of molten glass exiting the top of stirrer well 12 will separate into an upstream or back flowing mass, depicted by arrow 19, and a downstream flowing mass represented by arrow 20. So long as the forehearth flow rate upstream of mixing block 10 is equal to the forehearth flow rate downstream of block 10 the flow rate corresponding to arrow 20 will equal the forehearth flow rate and the reverse flow rate, corresponding to arrow 19, will equal the difference between the mixing block flow rate and the forehearth flow rate. As long as an equilibrium flow condition is maintained a given amount of back mixing will occur. However, because of possible process fluctuations the forehearth flow rate downstream of mixing block 10 may increase or decrease. If the downstream flow rate temporarily increases, glass level 26 may be expected to drop thereby reducing the head of glass atop the downstream portion of block 10 reducing the downstream hydraulic resistance to the exit flow of glass from well 12. More glass will then flow downstream (arrow 20) upsetting the back mixing balance and possibly permitting unmixed upstream glass to overrun the top of mixing block 10. Conversely, if the downstream flow rate decreases the glass level 26 will rise, increasing the downstream hydraulic resistance causing a corresponding increase in the back flow 19. The upstream glass level 25 will also rise increasing the hydrostatic head under which stirrer 16 is working requiring greater power input.

Figure 4:
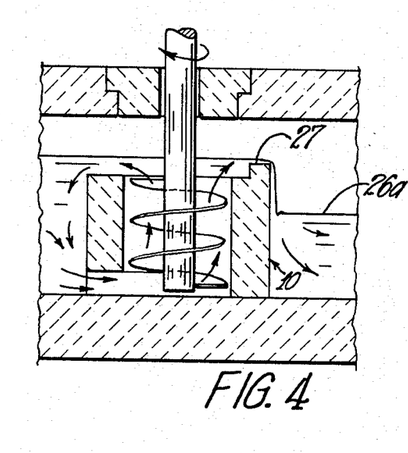
FIG. 4 presents a cross-sectional elevation of an up-pumping mixing block having a downstream dam thereon to maintain the upstream forehearth level.

The unstable forehearth flow problem may be remedied by locating a weir downstream of mixing block 10 to stabilize the molten glass level 26 or more preferably, by positioning a dam 27 at the downstream edge of block 10 as shown in FIG. 4.

Dam 27 may be positioned atop mixing block 10 at its downstream edge extending across the top of the block. When employing dam 27 to stabilize the mixing block exit flow it may be desired to maintain the downstream forehearth glass level 26a at a level below dam 27 as shown in FIG. 4. Thus variations of the downstream forehearth molten glass level 26a will not affect the back mixing function of mixing block 10.

Figure 5:
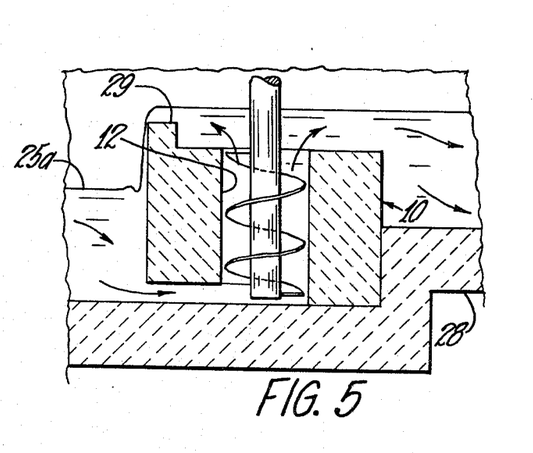
FIG. 5 presents a cross-sectional elevation of an up-pumping mixing block supplying an elevated downstream forehearth.

FIG. 5 presents an embodiment of a single up pumping mixing block wherein the molten glass is discharged to a downstream forehearth 28 of higher elevation than the upstream forehearth. An upstream dam 29 is preferably positioned atop mixing block 10, as shown, to create an upstream hydraulic resistance to the molten glass exit flow from well 12 otherwise lost because of the low upstream molten glass level 25a. The embodiment of FIG. 5 may also be employed to prevent the possibility of unmixed molten glass streaking across the top of the mixing block because of dowwnstream process variations or stirrer malfunctioning.

Figure 6:
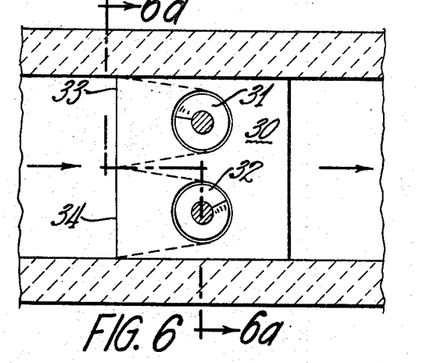
FIG. 6 presents a plan view of a typical multistirrer mixing block.
Figure 6A:
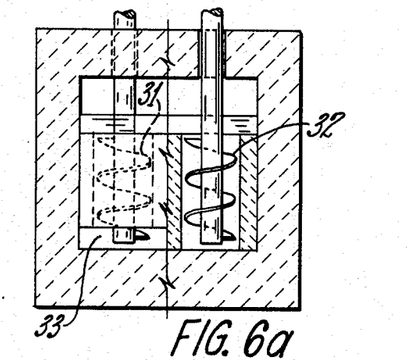
FIG. 6a presents an elevational view along line 6a—6a of FIG. 6.

Since the amount of volumetric flow and shear mixing within a mixing block is an engineering trade off affected by stirrer input torque limitations, it may be preferred to adopt a multi-stirrer arrangement. FIGS. 6 and 6a present a suggested multiple stirrer mixing block configuration. Dual up pumping stirrers 31 and 32 positioned within mixing block 30 are supplied by submerged intake ports 33 and 34 respectively. Although FIG. 6 depicts two stirrers, it is conceivable within the broad principles of the present invention that any multiple number of stirrers may be employed limited only by the physical geometry of the forehearth.

The up pumping, back flowing mixing block embodiments discussed above may be particularly effective for homogenizing a molten glass composition as it flows through a forehearth to the forming positions. However, the class of embodiments as shown in FIGS. 1 through 6 are not necessarily optimum for blending and homogenizing into a flowing host glass composition an additive that is significantly less dense than that of the host composition. If the low density additive is introduced upstream of the mixing station it will tend to float atop the molten host glass thus escaping the submerged intake port of the stirrer well. If the low density additive is introduced within the submerged intake port or within the mixing well, its floating tendency combined with the upward flow of host glass passing through the mixing well exit will cause it to surface and float atop the molten host glass.

Figure 7:
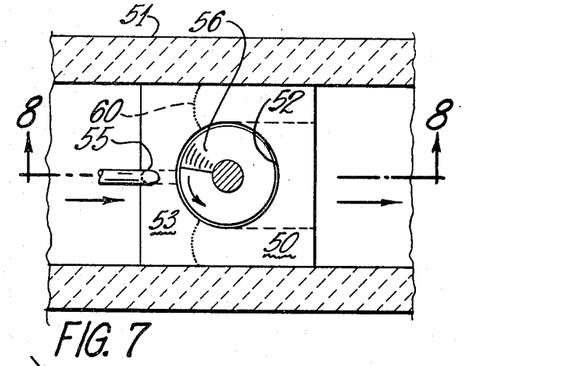
FIG. 7 presents a plan view of a typical down pumping mixing block suitable for blending an additive into a flowing host glass composition.
Figure 8:
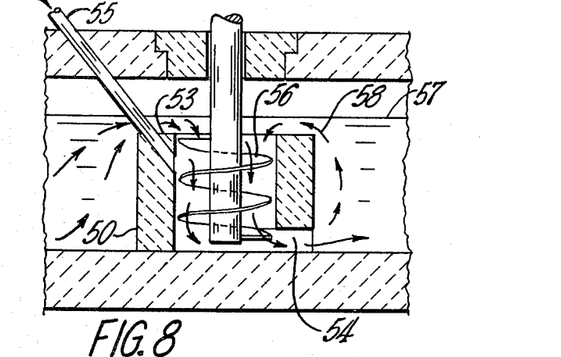
FIG. 8 presents a cross-sectional elevation taken along line 8—8 of FIG. 7 showing the mixing block elements and flow pattern.

An alternative embodiment more suitable for blending and homogenizing a relatively low density additive into a host composition is the down pumping mixing block. FIGS. 7 and 8 present plan and side elevation views of a down pumping mixing block employing a single stirrer therein. Mixing block 50 extends across the width of forehearth 51 presenting a dam like obstruction to the flow of molten glass. Stirrer well 52 extends from the block top surface 53 downward through block 50 communicating with passageway 54 similar to FIGS. 1 through 5. However, since block 40 is a downward pumping block, passageway 54 becomes an exit port preferably exiting to the downstream side of block 50.

Figure 11:
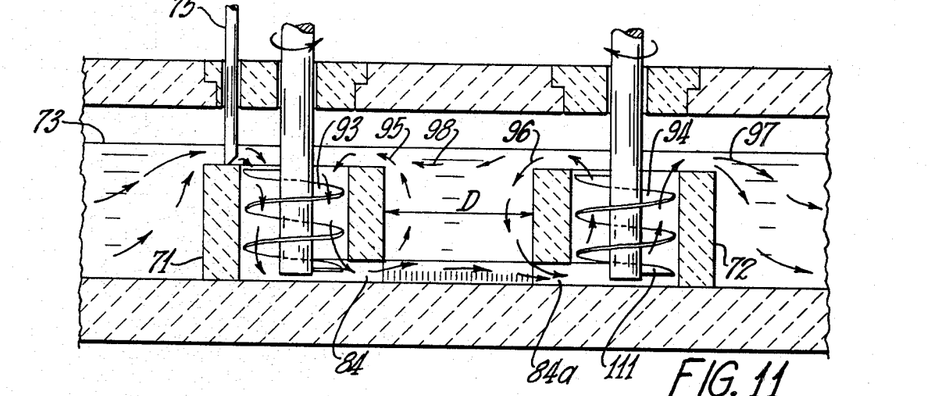
FIG. 11 presents a cross-sectional elevation along line 11—11 of FIG. 10 showing the mixing station elements and flow pattern.
Figure 12:
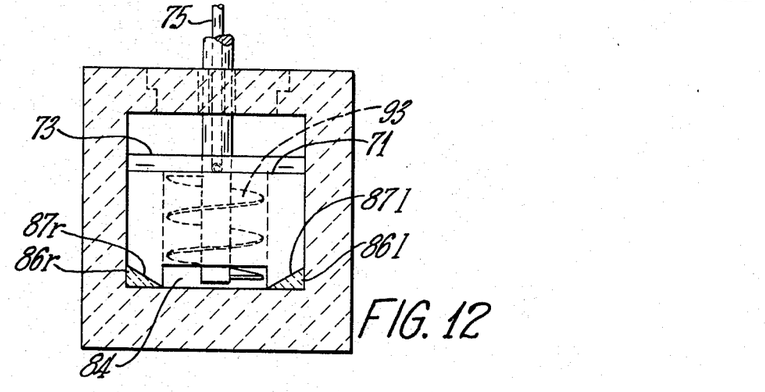
FIG. 12 presents an elevational view along line 12—12 of FIG. 10.

Molten glass flowing through forehearth 51 is forced to flow over the top of block 50 and into the region of stirrer 56's influence. Stirrer 56 mixes and homogenizes the molten composition while pumping it downward through mixing block 50 by a shear mixing action similar to that described above for the upward pumping block configuration. A suitable conduit 55 may introduce the additive constituents, either in the melt phase or as a batch formulation, directly into the stirrer well 52 or upstream of the well as shown in FIG. 11.

The volumetric pumping rate of stirrer 56 is preferably greater than the forehearth operating throughput, thereby creating a back flow of blended molten glass as depicted by arrow 58. The back flow of blended glass establishes a fluidic front or dam depicted by broken line 60 in FIG. 7. The location and wave form of fluidic front 60 is a function of forehearth operating level, flow rate and back flow rate.

Alternatively stirrer 56 may be operated at a pumping rate equal to that of the forehearth operating throughput thereby eliminating the back flow 58. For this operational condition it is preferable to position a dam atop block 50 at its downstream edge and projecting above the molten glass level to prevent unmixed host glass from overrunning the block without being cycled through the stirrer well.

When preparing a molten glass composition by the multiple step method described in co-owned U.S. patent application Ser. No. 680,841 filed May 5, 1976 it has been found most preferable to use a multiple block mixing station to adequately blend, react and homogenize the relatively low viscosity molten additive composition into a rather high viscosity host glass composition. For example, consider intermixing a molten additive having a viscosity around 1.3 poise into a host composition of approximately 2,000 poise. Because of the large viscosity difference between additive and host, the additive if not blended immediately upon introduction into the host, will tend to remain separated under the influence of density differences compounding the mixing problem.

Figure 9:
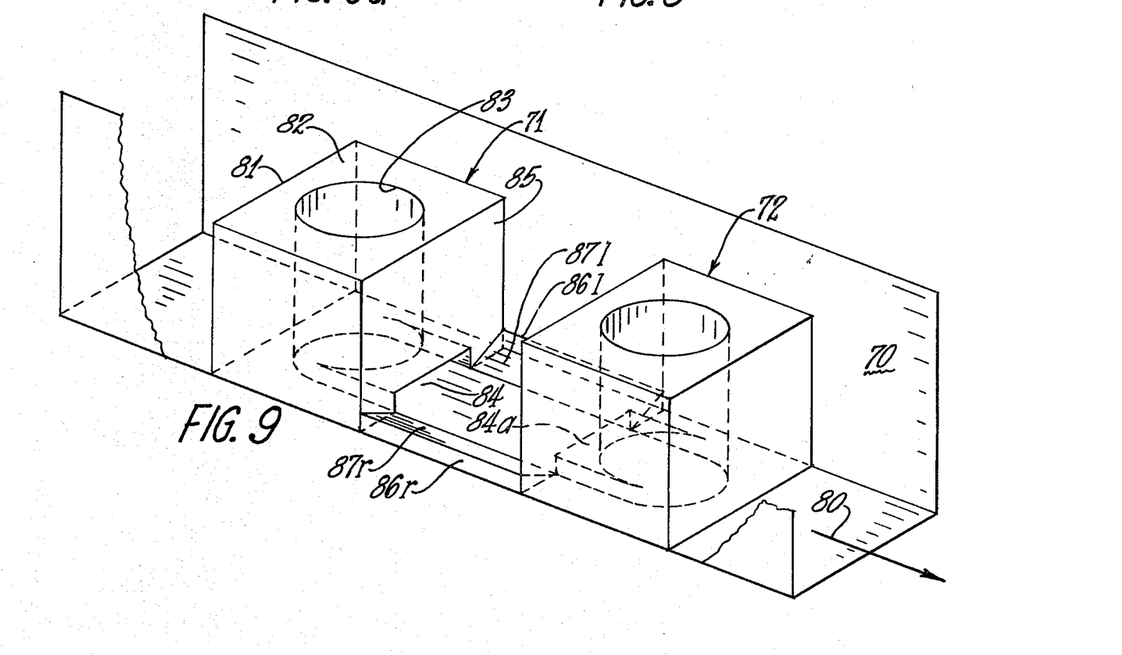
FIG. 9 presents a pictorial view showing a typical two block configuration positioned within a forehearth channel with stirrers removed.

FIG. 9 presents a pictorial view of the forehearth mixing zone with stirrers not shown so that the configuration and orientation of mixing blocks 71 and 72 may be viewed more clearly. The general flow of molten glass is from the upper left of FIG. 9 to the lower right as indicated by arrow 80.

Block 71 extends across the forehearth channel with its upstream face 81 acting as a barrier or dam to the flow of molten host glass. Cylindrical stirrer well 83 extends downward from the top surface 82 of block 71 communicating with rectangular passageway 84 extending longitudinally with the forehearth channel exiting at the block downstream face 85.

Mixing block 72, similar in configuration to block 71, is positioned downstream of block 71 with its passageway 84a facing upstream and opposite passageway 84 of block 71. Extending between mixing blocks 71 and 72 are key blocks 86L and 86R having an angular face 87L and 87R slanting from the forehearth side walls to the forehearth floor thereby forming in combination with the forehearth floor a flow channel communicating between passageway 84 of block 71 and passageway 84a of block 72.

Figure 10:
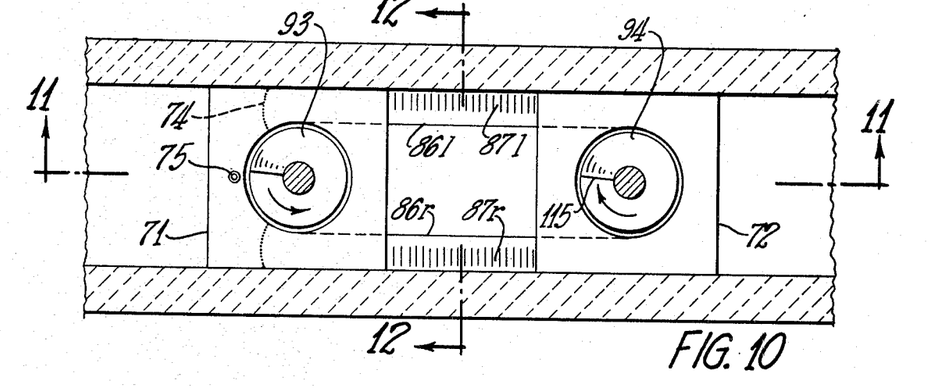
FIG. 10 presents a plan view of a typical two block forehearth mixing station suitable for blending and homogenizing an additive into a host glass composition flowing through the forehearth.

FIGS. 10 and 11 present a plan, and side cross-sectional elevation view respectively, of mixing blocks 71 and 72 with screw type stirrers 93 and 94 positioned therein. Stirrers 93 and 94 comprise a spiral blade wrapped about a central shaft rotatably powered, as indicated by the arrows in FIG. 10, by any preferred means such as a geared electric motor (not shown). Upstream mixing block 71 acts as a dam to the flowing molten host glass composition causing the host glass to flow over block 71 and into the region of stirrer 93's influence. Immediately upstream of stirrer 93 the additive composition is introduced to the host glass, through conduit 75, as it flows over the upstream portion of mixing block 71. The additive is preferably introduced below the surface of the flowing host glass composition as shown.

Figure 22:
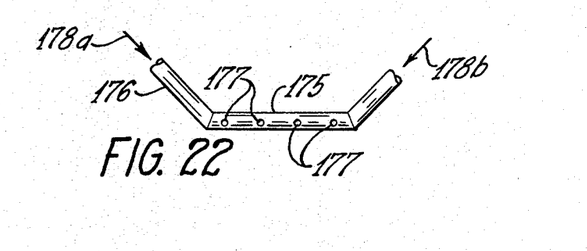
FIG. 22 shows a manifold suitable for submerged dispensing a molten additive into a flowing host glass.

Alternatively the additive may be dispensed below the surface level of the host glass by means of a manifold distributor 175, shown in FIG. 22, generally located atop the mixing block and upstream of the stirrer well.

The manifold distributor 175 generally comprises an elongate tube 176 having downstream or upstream facing holes 177 through which the additive is dispensed into the molten host glass. The manifold distributor may be supplied with additive material from opposing ends thereof as shown by the arrows 178a and 178b to prevent stagnant pooling therein or may be capped at one end and supplied from the other.

Stirrer 93 blends the molten host glass and additive while pumping the mixture downward through mixing block 71 causing it to exit in a downstream direction from passageway 84. Key blocks 86L and 86R channel a portion of the exiting mixture to passageway 84a of block 72 which acts as an intake port for block 72. As indicated by arrow 95 in FIG. 11 a portion of the molten mixture exiting from passageway 84 flows upward and is drawn back into mixing block 71 and thereby re-cycled through stirrer 93. The portion of molten mixture channeled to passageway 84a is further mixed while being pumped upward through block 72, by action of stirrer 94. Exiting at and flowing over the top surface of block 72 is the final homogenized molten glass composition. A portion of the molten glass exiting the top of block 72 flows upstream and is re-cycled through block 71 and 72 as indicated by flow arrows 98 and 96 respectively. The remaining portion of molten composition, indicated by arrow 97, flows downstream to the distribution forehearth. The reverse flowing glass, arrows 95, 96 and 98 cause the natural occurance of a fluidic front or dam to be established atop mixing block 71 as indicated by line 74. The presence of fluidic front 74 directs the flow of unmixed molten host glass through mixing block 71 preventing fluidic short circuiting. Alternatively a structural dam may be constructed atop block 71 to replace fluidic front 74 thereby assuring the flow of all virgin host glass through block 71.

In the embodiment of FIGS. 9 through 12, upstream block 71 functions principally to intermix and blend the additive composition into the host glass simultaneously pumping the mixture downward through the mixing block and into the reservoir of reacting constituents residing between blocks 71 and 72. Thus, a forehearth residence zone D is provided between blocks 71 and 72 within which the flow of blended molten constituents exiting block 71 through passageway 84 may react prior to entering the intake passageway 84a of block 72.

The amount of mixing by stirrer 94 may be increased by various modifications. A preferable modification, which has proven successful, is placing flow deflecting baffles upon the stirrer spiral flight thereby inducing additional mechanical shear mixing forces to the molten mixture as it flows along the spiral flight surface.

Figure 13:
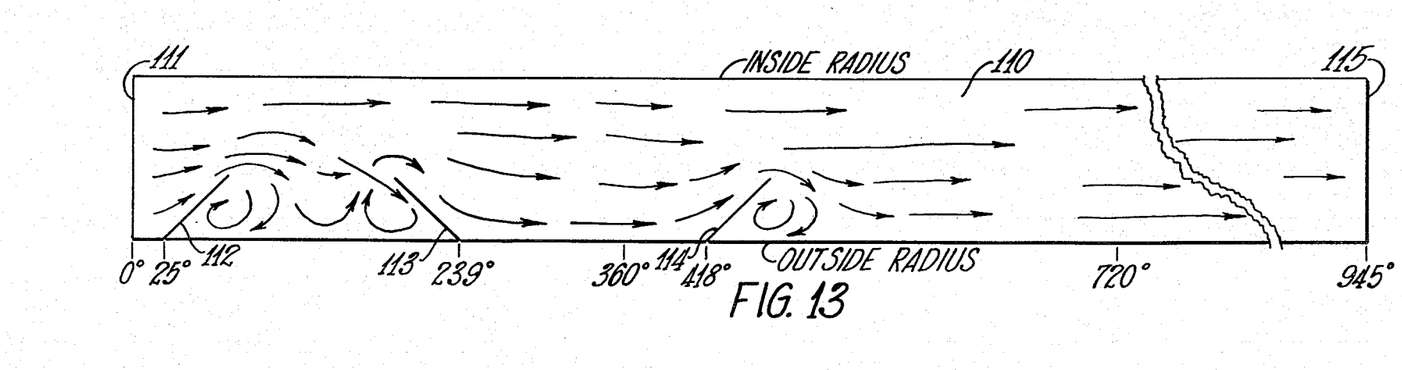
FIG. 13 presents a spiral flight layout showing the orientation and location of flow deflecting baffles positioned thereon.

FIG. 13 shows the preferred placement of three flow directing baffles affixed to an up pumping spiral stirrer having a 2⅝ turn or 945° spiral flight. For simplicity of illustration the spiral flight is shown as an unwrapped planar projection layout of the flight's surface 110 from the bottom leading edge 111 (0°) to the top trailing edge 115 (945°). As the molten glass mixture progresses upward along the flight surface 110, the first baffle 112 is encountered deflecting the molten glass inward toward the stirrer shaft. Subsequently baffles 113 and 114 alternately deflect and agitate the molten glass. The preferred location of baffles 112, 113 and 114 is at the spiral flight's 25°, 239° and 418° position respectively. Positioning baffle 112 within the first 30° of the flight causes the baffle to entrap the molten glass and force it into the confines of the stirrer as the spiral rotates, increasing the pumping efficiency of the stirrer. Alternately baffle 112 might be positioned at the flight's leading edge (0°). The baffles may also be symmetrically positioned so that the summation of radial forces imparted to the spiral shaft by their presence equals zero. Baffles 112, 113 and 114 preferably extend axially between adjacent flights of the stirrer. For example, baffle 112 may extend between the stirrer's 25° and 385° position. However, the baffles may be structured such that they axially project only a portion of the distance between adjacent flights.

Figure 14:
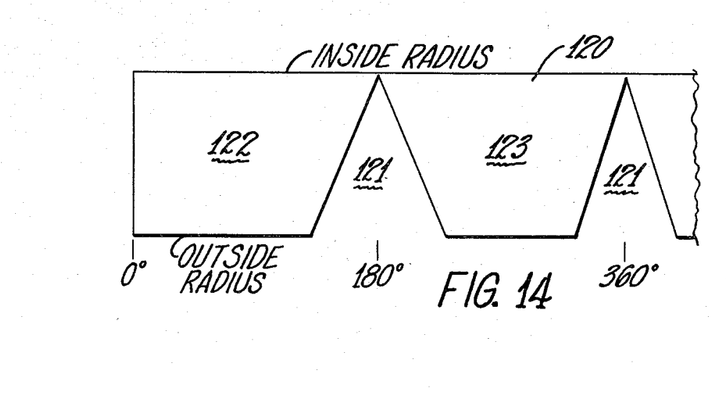
FIG. 14 presents a portion of a modified spiral stirrer flight layout having cut out portions to effect intermixing and mass transfer between adjacent flights.

FIG. 14 presents a portion of a planar projection 120 of an alternative stirrer flight modification. Symmetrically located at the stirrer's 180°, 360°, 540° and 720° positions are triangular openings such as 121 made by removing sectors of the spiral flight surface. Thus, the spiral stirrer becomes a series of tandem spiral segments 122, 123, etc., each separated from the preceding segment by an open area such as 121 whereby the molten glass may blend and react with molten glass at an adjacent flight level as it generally progresses upward through the stirrer well.

Figure 15:
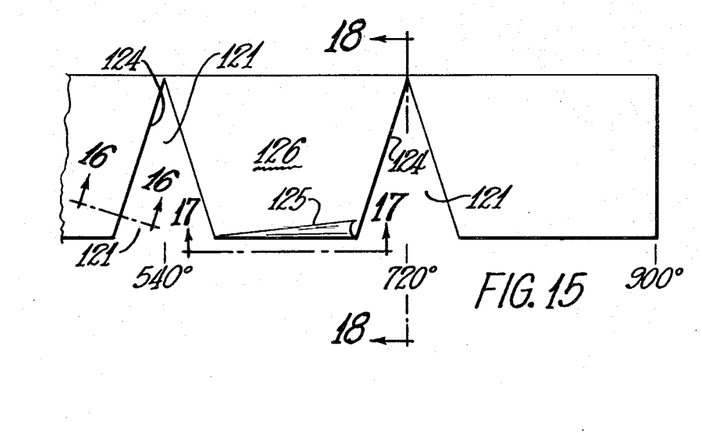
FIG. 15 presents a portion of a modified spiral stirrer flight having deflected flight segment trailing edges and turned up outside radius edges.
Figure 16:
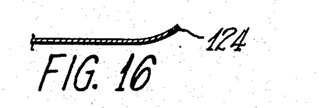
FIG. 16 presents a view along line 16—16 of FIG. 15.

Further, alternative embodiments of the slotted spiral flight shown in FIG. 14 are presented in FIG. 15 which depicts the latter half of a 2½ turn spiral stirrer's flight. The trailing edge 124 of the spiral segment may be curved as shown in FIG. 16 which presents a view taken along line 16—16 in FIG. 15. Such a modification induces a rolling or turbulent mixing action to the molten glass as it flows off the flight segment. Thus, the intermixing action of the interfacing molten masses within the zone 121 may be enhanced.

Figure 17:
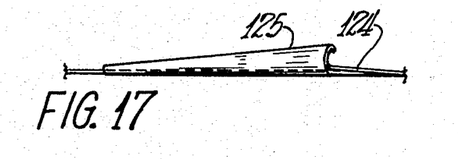
FIG. 17 presents a view along line 17—17 of FIG. 15.
Figure 18:
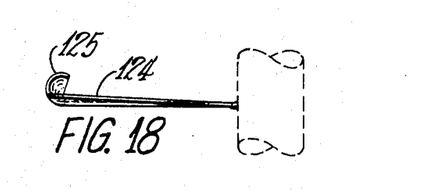
FIG. 18 presents a view along line 18—18 of FIG. 15.

A further modification is shown in FIGS. 17 and 18 presenting views taken along lines 17—17 and 18—18 respectively in FIG. 15. In addition to turning the trailing edge 124 of the spiral segment upward, as in FIG. 16, the outside edge of the spiral segment may be rolled upward and inward, as shown. Such a conical outside edge configuration tends to impart a trailing vortex type flow of molten glass behind segment 126 further increasing the intermixing action of the interfacing molten masses.

Figure 19:
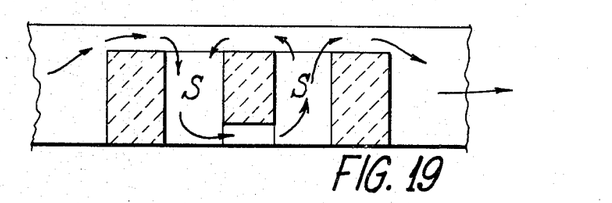
FIG. 19 presents a schematic cross-sectional view along a forehearth center line showing an alternate tandem stirrer configuration.
Figure 20:
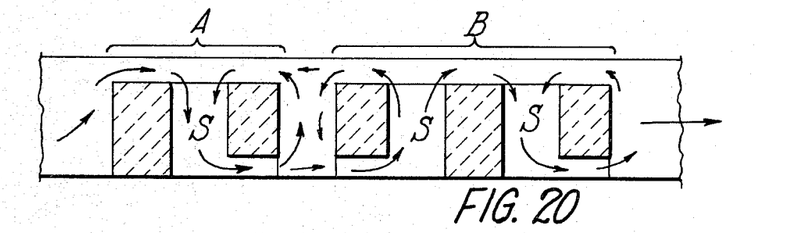
FIG. 20 presents a schematic cross-sectional elevation view along a forehearth center line showing a three stirrer configuration.
Figure 21:
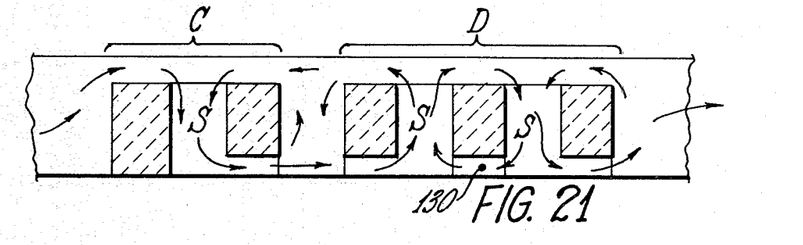
FIG. 21 presents a schematic cross-sectional elevation view along a forehearth center line showing an alternative three stirrer configuration.

Many combinations of up pumping and down pumping mixing blocks are conceivable to obtain blending, intermixing and homogenizing of molten glass as it flows through the forehearth. FIGS. 19 through 21 are intended to merely suggest some possible combinations to those skilled in the art for consideration and not to limit the embodiments of our invention.

FIG. 19 presents an elevational schematic of a down pumping and an up pumping unit tandemly oriented without an interposed residence zone therebetween. The symbol S denotes the stirrer wells (with spiral stirrer not shown). The flow arrows indicate whether the stirrer well pumps upward or downward.

FIG. 20 presents an elevational schematic of two tandemly oriented mixing stations A and B having a residence zone interspaced therebetween. This embodiment functions similar to the embodiment of FIGS. 10 through 12. However, an additional down pumping unit is positioned immediately downstream of the up pumping unit functioning as the embodiment shown in FIG. 8.

FIG. 21 presents an elevational schematic of two tandemly arranged mixing stations C and D having a residence zone therebetween. This embodiment functions similar to the embodiment of FIG. 20. However, an additional passageway 130 is provided communicating between the up and down pumping stirrer wells providing for a mass exchange from the down pumping well to the up pumping well.

It should be recognized by those skilled in the art that mixing stations B and D of the embodiments shown in FIGS. 20 and 21 may also be used separate and apart from stations A and C respectively.

We claim:

1. Apparatus for homogenizing molten glass flowing through a forehearth channel comprising, a flow restricting block projecting upward from the channel floor and extending across the width of said channel adapted for causing molten glass flowing through said channel to flow over the upstream top surface of said block, an internal passageway formed in said block descending from the block's top surface and communicating with the downstream forehearth channel, stirrer means positioned within said internal passageway for simultaneously stirring and pumping molten glass downward through said passageway at a flow rate greater than the average forehearth flow rate and thereby causing a back flow of molten glass from the downstream forehearth channel over the top downstream surface of said block to be recycled through said passageway.

2. Apparatus for mixing a stream of molten glass flowing through a forehearth channel comprising, a flow restricting block projecting upward from the channel floor and extending across the width of said channel dividing the channel into an upstream portion and a downstream portion, said block having a height less than that of the molten glass working level within the forehearth channel, said block having a cylindrical passageway extending from the block's top surface toward the channel floor and communicating with the downstream portion of the forehearth channel, spiral stirrer means positioned within said passageway for simultaneously mixing and pumping molten glass downward through the passageway at a flow rate greater than the mean forehearth channel flow rate, causing a portion of the molten glass downstream of said block to be drawn upstream and recirculated through said passageway.

3. The apparatus claimed in claim 2 including conduit means for introducing an additive upstream of said cylindrical passageway.

4. Apparatus for homogenizing, molten glass flowing through a forehearth channel comprising two tandemly spaced flow restricting blocks projecting upward from the channel floor and extending across the full width of said channel, the height of said blocks being less than the molten glass depth within the channel, each of said blocks having formed therein an internal passage descending from the block's top surface and communicating with the channel reservoir formed between the two blocks, stirrer means positioned within the internal passage of the upstream block for simultaneously stirring the molten glass and causing it to flow downward through the block, and stirrer means positioned within the internal passage of the downstream block for simultaneously stirring and pumping molten glass upwardly through the block, said stirrers being so arranged and constructed that an upper portion of the molten glass flows upstream of said downstream block into the channel reservoir extending between the two blocks and an upper portion of glass in the channel reservoir flows upstream into the top surface portion of said internal passage of said upstream block.

5. The apparatus of claim 4 wherein said forehearth channel carries intermediate said spaced blocks two opposed blocks with downwardly and inwardly facing slanting surfaces.

6. Apparatus for mixing molten glass comprising a glass melter, a forehearth channel extending from said melter, two longitudinally disposed blocks extending transversely of said channel width in a dam like manner having a height less than that of the molten glass working level within said channel, each of said blocks having formed therein a vertical passage extending from the block top surface toward the channel floor and communicating with a passageway extending longitudinally from said vertical passage and having a transverse opening, spiral stirrer means positioned within the vertical passage of each block, said blocks being so oriented such that the longitudinal passageway of the upstream block exits at the block's downstream side and the longitudinal passageway of the downstream block is disposed opposite said longitudinal passageway of said upstream block, the respective spiral stirrers being operated such that the upstream stirrer blends and pumps molten glass flowing over the block top surface downward through said block and the downstream stirrer blending and pumping molten glass upward through said block with a portion of the glass being recirculated in an upper surface flow to the passage of said upstream block.

7. Apparatus for mixing molten glass flowing through a channel comprising, a flow restricting block projecting upward from the channel floor and extending across the width of said channel, said block having a height above said floor less than the working depth of the molten glass flowing through said channel, said block having formed therein a first and second cavity each extending downward from the block's top surface and tandem one to the other, passage means formed in said block adjacent the channel floor establishing fluid communication between said first and second cavities, spiral stirrer means positioned within each cavity and operating such that molten glass is pumped downward through said first cavity, through said passageway and upward through said second cavity with a portion of said glass from said second cavity flowing back to said first cavity in a surface flow above said block.

8. Apparatus for blending and mixing molten glass flowing through a channel comprising, a first and second flow restricting block each projecting upward from the channel floor and extending across the width of said channel, said first block being upstream of said second and tandemly separated therefrom forming a reservoir therebetween, each of said blocks having a height less than the molten glass working level within said channel, said first block having formed therein a descending cavity from the block's top surface fluidly communicating with said reservoir, said cavity having positioned therein a downward pumping spiral stirrer means, said second block having formed therein a first and second cavity each extending downward from the block's top surface and tandem one to the other with respect to the channel flow direction, said first cavity being upstream of said second cavity and in communication with said reservoir and said second downstream cavity communicating with that portion of the channel downstream of said second block, spiral stirrer means positioned within each cavity and operated such that at least a portion of molten glass is pumped from said reservoir upward through said first cavity and downward through said second cavity and another portion flowing through said first cavity flows back to said reservoir above the surface of said second block.

9. Method for operating a glass melting furnace having a melting zone and at least one processing zone disposed adjacent to said melting zone and which is connected by a passage thereto, the method which comprises causing molten glass to flow from said melting zone to said processing zone, withdrawing a portion of the molten glass from the top of said processing zone laterally in a surface flow, recirculating the withdrawn portion of molten glass to said processing zone or to a separate refining zone by flowing the recirculated portion of molten glass into the passage connecting the melting zone and the processing zone and applying a submerged, downwardly directed impulse to the recirculated glass.

10. Method of claim 9, wherein the volume of glass flowing into said processing zone is a multiple of the volume of glass withdrawn therefrom.

11. Glass melting furnace comprising melting means and at least one processing tank means communicating with said melting means through passage means, recirculating passage means connecting the top of the processing tank means and said passage means and means connected with said passage means for establishing a recirculating flow of molten glass via said recirculating passage means comprising submerged agitator means operating in the direction of flow for applying a submerged downwardly directed impulse to the recirculating glass.

12. Glass melting furnace of claim 11 wherein each processing tank means has positioned therein at least one agitator means acting in the direction of flow.

13. Glass melting furnace of claim 12 wherein a pair of agitator means in a side by side arrangement and having opposite directions of rotation are provided wherein said agitator means have a block positioned therebetween.

14. Glass melting furnace of claim 11 wherein each processing tank means has positioned therein at least one agitator means.

15. Glass melting furnace of claim 11 wherein weir means are positioned in each processing tank means upstream of the inlet to said recirculating means.

16. Glass melting furnace of claim 11 wherein said submerged agitator means has the blades thereof extending to a point closely adjacent the wall of said recirculating means.

17. Glass melting furnace comprising melting means and at least one processing means communicating with said melting means through passage means, a recirculating passage means connecting the top of the processing means and said passage means and a submerged stirrer means for establishing a recirculating flow of molten glass via said recirculating passage means and applying a submerged downwardly directed impulse to recirculated glass.

18. The apparatus of claim 17 wherein said stirrer means is connected with said passage means and operates in the direction of flow.

19. Apparatus of claim 17 comprising a submerged block disposed intermediate said melting and processing means, an upper downstream surface portion of said block defining said recirculating passage means, said passage means having a well portion formed in said block extending downwardly from its top surface and a passageway portion in said block merging with said well, said stirrer means being positioned in said well and thereby establishing said recirculated glass flow and applying said impulse to glass in said well.

20. Apparatus of claim 19 further including an upwardly pumping stirrer disposed downstream of said submerged stirrer means.

21. Apparatus of claim 20 and further including a downwardly pumping stirrer disposed downstream of said upwardly pumping stirrer.

22. Apparatus of claim 20 and further including a second block, said second block defining a bottom upstream passageway in communication with said processing means and having a well extending upwardly from said passageway, said upwardly pumping stirrer being positioned in said well and being so arranged and constructed as to flow glass into said well through said upstream passageway and then to flow a portion of the glass from the well upstream into said processing means and another portion downstream.

* * * * *

UNITED STATES PATENT AND TRADEMARK OFFICE
CERTIFICATE OF CORRECTION

PATENT NO. : 4,278,460
DATED : July 14, 1981
INVENTOR(S) : Max G. Chrisman, Gary W. Ganzala, Ralph L. Tiede It is certified that error appears in the above—identified patent and that said Letters Patent is hereby corrected as shown below:

At column 11, line 59, the first word in the sentence should be "culating" (ending of last word in previous line).

At column 12, line 8, the first word in the sentence should be "ed" (ending of last word on previous line)

Signed and Sealed this

Twenty-fourth Day of November 1981

[SEAL]

Attest:

GERALD J. MOSSINGHOFF

Attesting Officer

Commissioner of Patents and Trademarks